United States Patent
Satalkar et al.

(10) Patent No.: US 9,251,260 B2
(45) Date of Patent: Feb. 2, 2016

(54) SOCIAL NETWORK INTERACTION FACILITATION FROM SEARCH RESULTS INTERFACE

(71) Applicant: Microsoft Corporation, Redmond, WA (US)

(72) Inventors: Gautam Satalkar, San Jose, CA (US); David Andrew Nelson, Brooklyn, NY (US); Jon Nicolas Myette, Lake Forest Park, WA (US); Gaurang Prajapati, Redmond, WA (US); Peiyu Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 13/674,935

(22) Filed: Nov. 12, 2012

(65) Prior Publication Data

US 2014/0136505 A1    May 15, 2014

(51) Int. Cl.
*G06F 17/30* (2006.01)

(52) U.S. Cl.
CPC ................ *G06F 17/30864* (2013.01)

(58) Field of Classification Search
USPC ......................... 707/706, 705, 707
See application file for complete search history.

(56) References Cited

U.S. PATENT DOCUMENTS

| | | | |
|---|---|---|---|
| 8,037,047 B2 | 10/2011 | Szeto et al. | |
| 8,229,959 B1* | 7/2012 | Yagnik | 707/782 |
| 8,577,868 B1* | 11/2013 | Zamir et al. | 707/710 |
| 2008/0177581 A1* | 7/2008 | Artinger | 705/4 |
| 2008/0288494 A1* | 11/2008 | Brogger et al. | 707/7 |
| 2009/0164929 A1* | 6/2009 | Chen et al. | 715/769 |
| 2009/0187537 A1* | 7/2009 | Yachin et al. | 707/3 |
| 2010/0005087 A1* | 1/2010 | Basco et al. | 707/5 |
| 2010/0030753 A1 | 2/2010 | Nad et al. | |
| 2010/0280904 A1* | 11/2010 | Ahuja | 705/14.58 |
| 2011/0010641 A1 | 1/2011 | Wolff et al. | |
| 2011/0252011 A1 | 10/2011 | Morris et al. | |
| 2011/0270678 A1 | 11/2011 | Drummond et al. | |

(Continued)

OTHER PUBLICATIONS

"Is Social Media Transforming Your Business?", Retrieved at <<http://www.oracle.com/us/products/applications/social-trans-bus-wp-1560502.pdf>>, Mar. 2012, pp. 16.

(Continued)

*Primary Examiner* — Jay Morrison
(74) *Attorney, Agent, or Firm* — Dave Ream; Tom Wong; Micky Minhas

(57) ABSTRACT

A user interface providing results to a user's search also facilitates user interaction with their social network. Such interaction includes a search context by which individuals from the user's social network can perform an equivalent search or access equivalent search results. The user can select individual search results to be shared and, in response to a search query, the user is provided with responsive search results, and also identification of individuals, from the user's social network, that are responsive to the user's search query. The sharing of search results includes a search context, through which the individuals to whom such search results are shared can perform an equivalent search and be presented with equivalent search results. The sharing of search results also includes the provision of a social context within which such search results are being shared.

17 Claims, 6 Drawing Sheets

(56) References Cited

U.S. PATENT DOCUMENTS

| | | | |
|---|---|---|---|
| 2012/0078870 A1* | 3/2012 | Bazaz | 707/706 |
| 2012/0158720 A1* | 6/2012 | Luan et al. | 707/732 |
| 2012/0246578 A1* | 9/2012 | Baldwin et al. | 715/753 |
| 2012/0290549 A1 | 11/2012 | Cheng et al. | |
| 2013/0036109 A1* | 2/2013 | Kulick et al. | 707/722 |
| 2013/0036114 A1 | 2/2013 | Wong et al. | |
| 2013/0144868 A1 | 6/2013 | Ickman et al. | |
| 2014/0057238 A1* | 2/2014 | Okamoto et al. | 434/308 |

OTHER PUBLICATIONS

Hurlock, et al., "Searching Twitter: Separating the Tweet from the Chaff", Retrieved at <<https://www.aaai.org/ocs/index.php/ICWSM/ICWSM11/paper/viewFile/2819/3284>>, Proceedings of Fifth International AAAI Conference on Weblogs and Social Media, Jun. 11, 2011, pp. 8.

* cited by examiner

SOCIAL NETWORK INTERACTION FACILITATION FROM SEARCH RESULTS INTERFACE

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

SUMMARY

In one embodiment, a user performing a search and receiving search results responsive to the user's search query can interact with the user's social network from within the interface providing the user the search results. Information associated with the search performed by the user, including contextual information, can be shared with the user's social network such that other individuals can perform an equivalent search and obtain equivalent search results.

In another embodiment, a user can individually select specific search results to share with individuals from a user's social network. The sharing of such individually selected search results can also include a search context, through which the individuals with whom such search results are shared can perform the shared search results in an equivalent manner.

In yet another embodiment, search results shared to individuals from a user's social network can include a social context, including a prior communicational history or social history between the user and the individuals to whom the search results are being shared.

In a further embodiment, a user can be automatically presented with individuals from the user's social network that can be associated with, or responsive to the search query, thereby enabling the user to more efficiently select individuals with whom to share selected ones of the search results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
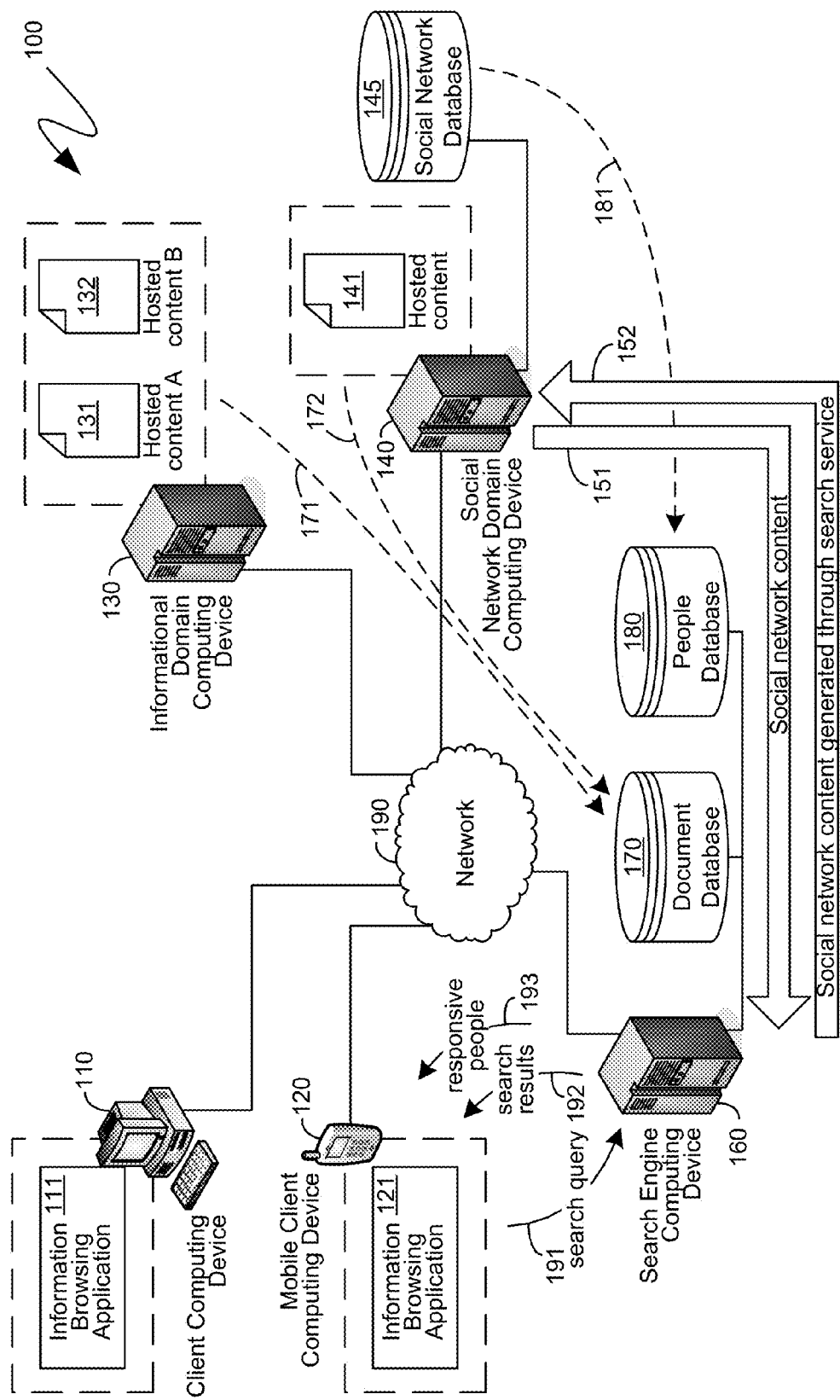
FIG. 1 is a block diagram of an exemplary network of computing devices exchanging communications for sharing search results with individuals from a user's social network.

The following descriptions are directed to mechanisms and interfaces through which a user can interact with their social network from within a context that includes the results of the user's search. In interacting with their social network, the search context can be automatically provided, and individual search results can be selected by the user to be shared with selected individuals. A user performing a search can be provided with responsive search results, and also an identification of individuals, from the user's social network, that are responsive to, or otherwise associated with, the user's search query. The user can be provided with selection capability for individual ones of the search results, and the selected search results can be shared with individuals from the user's social network, including the individuals identified as part of the search results. The sharing of search results can include the provision of a search context, through which the individuals to whom such search results are shared can perform an equivalent search and be presented with equivalent search results. The sharing of search results can also include the provision of a social context within which such search results are being shared.

For purposes of illustration, the techniques described herein make reference to existing and known application user interface contexts, such as user interfaces typically presented by Web browsers. Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any application user interface including, for example, lifestyle and/or entertainment applications, such as audio and/or video presentation applications, video games, virtual reality applications, electronic book readers, and other content consuming and presentation applications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, which provides context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, a search engine computing device 160 that can provide search functionality to users of client computing devices, such as the client computing device 110 or the mobile client computing device 120. The illustration of the search engine computing device 160 as a single device is strictly for illustrative simplicity, and the descriptions below are equally applicable to processes executing on single search engine computing device 160 or executing across multiple search engine computing devices, either in serial or in parallel.

The search engine computing device 160 can enable users of client computing devices to locate content accessible via the network 190. By way of example, an informational domain computing device 130 and a social network domain computing device 140 are exemplarily shown as being communicationally coupled to the network 190 to provide context for the descriptions below. The informational domain computing device 130 can comprise hosted content 131 and 132. In one embodiment, the informational domain computing device 130 can be a traditional Web server computing device hosting one or more webpages, which typically provide informational content in the form of textual content, image content and other like hypermedia and multimedia content. The social network domain computing device 140 can comprise hosted content 141 that can be dynamically generated based upon information retrieved by the social network domain computing device 140 from the social network database 145 to which it is communicationally coupled. In one embodiment, the social network domain computing device 140 can be a computing device hosting a Web-based social network website through which users exchange textual messages, images, establish business connections, and perform other like social network functionality. In such an embodiment, the hosted content 141 can represent a dynamically generated webpage, such as a webpage on which users can post images or messages and have other users comment and leave feedback.

As will be recognized by those skilled in the art, in order to provide search functionality to users of client computing devices, the search engine computing device 160 can obtain information about the content available via the network 190, such as the content hosted by the informational domain computing device 130 or the content hosted by the social network domain computing device 140. For example, as illustrated by the arrows 171 and 172, the search engine computing device 160 can be communicationally coupled to a document database 170 that can comprise information collected from the hosted content 131 and 132 of the informational domain computing device 130 and the hosted content 141 of the social network domain computing device 140. Since such hosted content is typically divided into units, or "pages", of information, such as the ubiquitous webpage, the database 170 is referred to as a document database even though the information contained therein need not be retained in page format, but rather can be organized in matrices, or other like data structures, to enable efficient searching thereof.

In one embodiment, in addition to the document database 170, the search engine computing device 160 can have access to a people database 180. Such a people database can comprise information about human individuals, including identifying information, such as a name, age, address and the like, and relationship information, such as which individuals are known to one another, are friends of one another, or are otherwise associated with one another. For clarity within the graphical presentation context of FIG. 1, the term "people" is utilized to refer to one or more human individuals and, as such, the terms "people" and "individuals" are used synonymously herein. As will be recognized by those skilled in the art, within the social networking context, the term "friend" is typically utilized to mean any individual with whom a human relationship exists. Consequently, the term "friend" will be utilized in a like manner in the descriptions below. The people database 180 can be generated utilizing a variety of mechanisms. For example, in one embodiment, the people database 180 can be generated by referencing the document database 170, the information of which can be utilized to identify specific human individuals, as well as collect information about those individuals. In another embodiment, the people database 180 can be generated by collecting information from other databases such as the social network database 145, as illustrated by the arrow 181. For example, the social network database 145 likely already comprises information segmented based on individual people. Such information can be collected directly from the social network database 145 and utilized to populate the people database 180. Additionally, the document database 170 and the people database 180 can augment information collected from one another. For example, people in the people database 180 can be created based on individuals identified in the social network database 145, but then such entities can have additional information associated with them based upon documents, relevant to the individuals of the social network database 145, that are part of the document database 170. In an analogous manner, as another example, entries associated with people in the people database 180 can be created based upon information obtained from the document database 170, and can then have additional information associated with them based upon the information stored in the social network database 145.

Both the client computing device 110 and the mobile client computing device 120 are shown as comprising information browsing applications 111 and 121 to illustrate that the mechanisms described below are equally applicable to mobile computing devices, including laptop computing devices, tablet computing devices, smartphone computing devices, and other like mobile computing devices, as well as to the ubiquitous desktop computing devices. For purposes of the descriptions below, references to the information browsing application 111 executing on the client computing device 110 are intended to be equally applicable to the information browsing application 121 executing on the mobile client computing device 120, and vice versa. In one embodiment, the information browsing application 111, or the information browsing application 121, can be the ubiquitous web browser that can retrieve and display information in the form of websites that are hosted by web servers communicationally coupled to the network 190, such as those described above. However, as indicated previously, the mechanisms described below are not limited to World Wide Web-based environments. Thus, for example, the information browsing applications 111 and 121, can be other types of information browsing applications including, for example, e-book readers, universal document format readers, or even content creation applications, such as word processors, spreadsheets, presentation applications, and e-mail applications. Yet another type of information browsing application can be an operating system itself, including, for example, operating systems comprising support for known networking protocols for the receipt and presentation of information and operating systems comprising information browsing components or built-in or included information browsing applications.

A user of the client computing device, such as the client computing device 110 or the mobile client computing device 120, can utilize the search functionality provided by the search engine computing device 160 by submitting a search query 191 to the search engine computing device 160. As will be recognized by those skilled in the art, such a search query can represent information, typically textual information, although it can include images, audio, and other like multimedia and hypermedia content, about which the user desires to obtain additional information from among the content available via the network 190. In response to the search query 191, in one embodiment, the search engine computing device 160 can provide search results 192, such as, for example, traditional document search results that are typically provided in the form of web links to documents in the form of webpages, together with an identification of responsive people 193 that are deemed to be responsive to the search query 191.

In one embodiment, and as will be described in further detail below, a user submitting the search query 191 can select individual ones of the search results 192 to share with one or more individuals from that user's social network including, for example, one or more of the responsive people 193. In such an embodiment, existing social network content can be retrieved, such as by the search engine computing device 160, from the social network domain computing device 140 utilizing, for example, application program interfaces designed for the retrieval of such social network content. Within the context of such existing social network content, additional social network content can be generated through the search service including, for example, social network content referencing and sharing one or more of the search results 192. Such additional social network content generated through the search service can be provided back to the social network domain computing device 140, again via application program interfaces designed for the provision of social network content generated externally to the social network domain. The communications 151 and 152 illustrate, respectively, such an exchange of existing social network content from the social network domain to the search service and for the provision, by the search service, to the social network domain, of social network content generated through such a search service.

Figure 2:
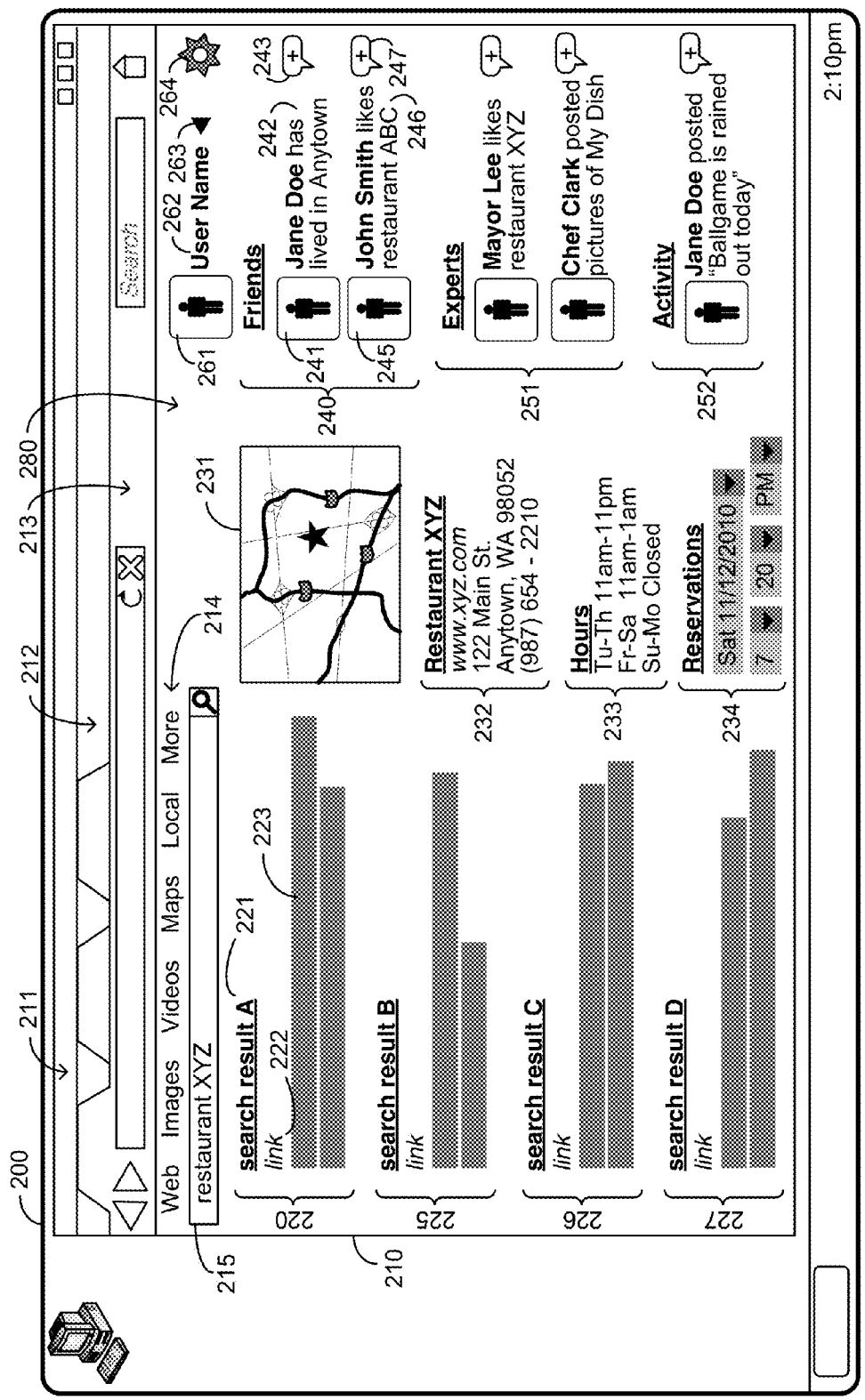
FIG. 2 is a block diagram of an exemplary user interface for providing search results and individuals from a user's social network relevant to a search query generating such search results.

Turning to FIG. 2, an exemplary user interface 200 is illustrated to provide context for the descriptions below. The exemplary user interface 200 can comprise a multi-pane presentation of multidimensional search results. Although illustrated within the context of a sort of user interface that would typically be presented by a personal computing device, the descriptions provided below are equally applicable to the sort of user interfaces provided by mobile computing devices. Providing context for the descriptions below, the exemplary user interface 200 of FIG. 2 is shown as comprising a desktop user interface motif within which an application window 210 is presented. The application window 210 can be presented by an information browsing application, such as those described in detail above, which can receive multidimensional search results in response to a user's search query. The application window 210 can comprise a window control area 211 with which the appearance of the window 210 within the user interface 200 can be controlled. Additionally, in one embodiment, the information browsing application can be capable of presenting multiple different sets of content within tabs, and such tabs can be accessed through a tab selection area 212.

User specification of requested content can, in one embodiment, be controlled through a toolbar area 213, which can comprise mechanisms by which users can directly specify content, such as through content resource locators or other like content identifiers, mechanisms by which users can browse through content that was previously viewed, and other like content control mechanisms. The content itself can be displayed in a content presentation area 280 which, in the exemplary user interface 200 as illustrated in FIG. 2, can comprise content received from a search engine that is capable of providing search results comprising, not only the traditional document search results, but also entity search results and people search results. In particular, a search engine can provide links through which users can specify the type of content for which they are searching, an entry mechanism by which users can provide search queries, and, ultimately, search results. Within the context of the exemplary user interface 200 that is shown in FIG. 2, the links provided by the search engine are shown as the links 214 that are displayed in the content presentation area 280 and such links can, exemplarily, allow users to focus their search on images, videos, locations and the like. Similarly, the entry mechanism by which users can provide search queries is shown in exemplary user interface 200 as the search entry area 215, which is also displayed in the content presentation area 280.

To provide a specific exemplary context, a user being presented the exemplary user interface 200 of FIG. 2 can have searched for a particular retail establishment such as, for example, a particular restaurant. Consequently, the search entry area 215 is illustrated as comprising a user search query for a particular restaurant. In response to such query, the search engine can return various types of search results. One type of search results that can be returned can be an identification of documents or pages that reference the restaurant searched for, or are otherwise relevant to, such a restaurant. Thus, as illustrated in the exemplary user interface 200, oriented on the left side of the content presentation area 280, can be a listing of search results 220, 225, 226 and 227. The search results 220, 225, 226 and 227 can be presented in any format, though they are illustrated in the exemplary user interface 200 utilizing a common format for providing webpage search results within the context of the ubiquitous World Wide Web. Thus, for example, the search result 220 is shown as comprising an identification 221 of that search result, such as a name or title of the page or document identified, a link 222 to the page or document, and a snippet 223 comprising a small portion of the page or document, typically relevant to the user's search, that can be utilized to provide context for the user to enable the user to quickly determine whether or not the search result 220 is what the user was searching for. The search results 225, 226 and 227 are illustrated comprising similar elements.

Another type of search results that can be returned can comprise entity and task information that can be responsive to the user's search query. For example, in the exemplary user interface 200, where a user is being provided with search results responsive to the user's search query of a particular restaurant, the restaurant the user searched for, as an entity, can be identified and entity information, such as the location of that entity, the name address and contact information for such an entity, and other like entity information, can be presented. Thus, as shown in FIG. 2, a map 231 can indicate the location of the restaurant for which the user searched. Additionally, entity identification information 232 can provide identification of the entity including, for example, the name of the entity, a network domain maintained by the entity, a physical mailing address of the entity, telephone number of the entity, and other like entity identification information. Depending on the type of entity, other entity information can be relevant. Thus, in the exemplary user interface 200, the search engine can have provided, along with the entity identification information 232, entity operating information 233 which can include identification of the dates and times when the restaurant is open. Additionally, certain types of entities may have tasks associated with them. For example, reservation tasks can be associated with restaurant entities, hotel entities, rental car entities and the like. Thus, in the exemplary user interface 200, the search engine can have provided, along with the entity identification information 232 and entity operating information 233, a reservations task 234 by which a user can make a reservation at the restaurant entity that was deemed to be responsive to the user's search query.

Of relevance to the descriptions below, another type of search results that can be returned can comprise people search results that identify human individuals that are deemed to be relevant to the user's search query. Thus, as illustrated by the exemplary user interface 200 of FIG. 2, one or more friends 240 can be identified in response to the user's search query. In the particular example illustrated in FIG. 2, where a user searched for a specific restaurant, the friends 240 that are identified to the user need not necessarily be individuals that the user knows that have eaten at that specific restaurant, but rather can simply be individuals whom the user knows who have a connection to the user's search, such as by living the same town as the searched for restaurant, or have otherwise expressed an interest in food related topics.

To determine which individuals are friends of the user performing the search, the user performing the search can be identified such as, for example, by logging in, or providing other identification or authentication information. In the exemplary user interface 200 of FIG. 2, the user performing the search can be indicated in the content presentation area 280, such as with a display of the user's name 262, or other identifying information and a display of a photograph or image 261 that the user can have selected to act as a representation of the user. The display of the user's name 262 and image 261 can enable the user to verify that they are, in fact, properly identified by the searching service, such that the searching service will be able to accurately identify the user's friends and other individuals associated with the user through one or more social networking contexts, such as in order to display the people search results described herein. In one embodiment, various options, settings, preferences and the like can be accessed via a preferences selection 264 that can be displayed with the user's name 262 and image 261 since, as will be recognized by those skilled in the art, such preferences can be specific to the particular user. Additionally, other functionality available to the user, who is identified by the user's name 262 and image 261, can be accessed via user interface mechanisms that can, in one embodiment, initially remain hidden or otherwise not displayed. Such additional functionality can be accessed through a user interface element, such as the user interface element 263, that can operate in a well-known manner to display user interface elements that were previously not displayed, so as to, for example, leave a greater amount of the active display area for other display purposes.

Returning to the presentation of the people search results, in one embodiment, an individual, such as one of the friends 240, can be identified by a picture, information content, contact mechanisms through which such an individual can be contacted, and other like information. For example, as illustrated in the exemplary interface 200 of FIG. 2, the individual "Jane Doe" can be identified via a photograph or image 241, information content 242, and contact mechanisms, such as the messaging contact 243. The images presented with the identification of individuals can be images that are associated with those individuals, such as, for example, images that those individuals have chosen to represent them in one or more social networking contexts. Thus, for example, the image 241 can be an image selected by the individual "Jane Doe" to represent her within one or more social networking contexts. Alternatively, the image 241 can be an image selected by the user performing the search, which such a user can have assigned to the individual "Jane Doe" to aid the user in recognizing her. Contact mechanisms can also be based on information provided by such individuals in social networking contexts, or information provided by the user, such as information that can be collected from a local contacts database. For example, the messaging contact 243 can enable a user to send a message to the individual "Jane Doe", including messages, posts and comments sent through social networking contexts.

The informational content 242 that can be provided as part of the identification of an individual deemed to be responsive to a search query can identify the individual, such as by providing their proper name, and can provide an indication of the content authored by such individual that can have been deemed relevant to, or responsive to, the search query. The indication of the content can include an identification of the nature of the content, such as whether it was posted, messaged, or the like, or whether it is content that was simply commented upon, such as by being "liked" or otherwise positively or negatively reacted to by the individual. The indication of the content can also include a portion of the content, or other metadata about the content, such as a title of the content.

As illustrated in FIG. 2, the exemplary user interface 200 can include identifications of multiple friends 240, with each identification comprising at least some of the above-described elements. For example, the identification of the friend named "John Smith" as being someone who is responsive to the user's search query can comprise an image 245, informational content 246 and a messaging contact 247.

As also illustrated by the exemplary user interface 200, one or more experts 251 can also be identified in response to a user's search query. Such experts can, in one embodiment, have particularized knowledge that is relevant to the user's search query. Thus, in the specific example illustrated in FIG. 2, where the user's search query was for a specific restaurant, the experts 251 that can be identified can be individuals that have eaten at that specific restaurant and who have a particularized set of knowledge or experience relevant to restaurants or dining. In another embodiment, experts 251 need not have particularized knowledge relevant to the user's search query, but can simply be individuals considered to have expertise, or some other advanced knowledge, or knowledge not easily obtained, regarding one or more topics to which the user's search query may be relevant. For example, experts 251 need not comprise individuals that have eaten at the specific restaurant for which the user searched, but rather can be individuals who have expertise in restaurants, food preparation, dining, cuisine, and the like, irrespective of their knowledge of the specific restaurant for which the user searched. In yet another embodiment, experts 251 can be individuals whose options, insight or other intellectual product can be valued due to reasons other than their base of knowledge. For example, experts 251 can include celebrities, politicians and other famous people, irrespective of any particularized knowledge they may have regarding the user's search query. As another example, experts 242 can include influential individuals, or individuals who maintain connections with other powerful people, such as business or community leaders.

In one embodiment, in addition to an identification of people, search results can also include identification of activities performed by, or associated with, specific individuals that are relevant to the user's search query. Thus, for example, activity 252 can comprise actions performed by, or information posted by, those individuals that were presented as part of the friends 240, the experts 251, or combinations thereof. The activity 252 can, in such an embodiment, provide the user with easy access to the most recent information authored by, or shared by, individuals that were deemed to be relevant to the user's search query.

Figure 3:
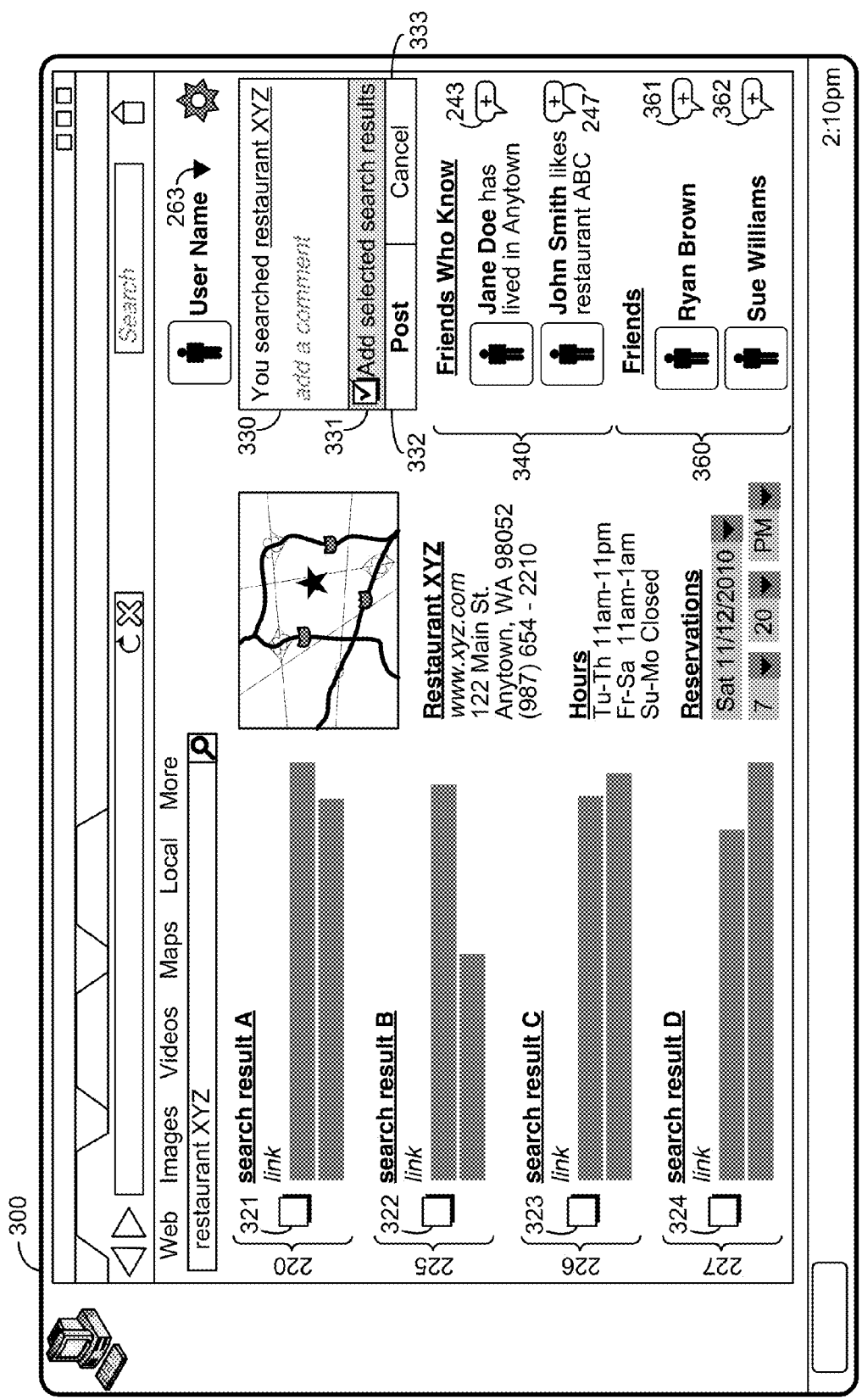
FIG. 3 is a block diagram of an exemplary user interface for sharing search results with individuals from a user's social network.

The user's search query, one or more of the search results 220, 225, 226 and 227, or combinations thereof may be relevant to individuals other than the user, including, for example, individuals with whom the user is connected via the user's social network. Consequently, in one embodiment, in addition to identifying individuals from a user's social network that are deemed to be responsive to the user's query, a search service can also enable a user to share one or more search results with individuals with whom the user is connected via the user's social network. Turning to FIG. 3, the exemplary user interface 300 shown therein illustrates one exemplary mechanism by which selected ones of the search results, provided in response to a search query, can be shared with one or more individuals. In the exemplary user interface 300 of FIG. 3, additional user interface elements can have been presented to the user in response to user action directed to the user interface element 263, such user action evidencing a desire to access such additional user interface elements.

The additional user interface elements that can be presented can include an information entry area 330, a selection 331 directed to one or more of the search results, a post selection 332 and a cancel selection 333. In the embodiment illustrated by the exemplary user interface 300 of FIG. 3, the user to whom the search results were presented can share such search results with one or more individuals through messaging mechanisms provided by one or more social network services. In particular, in the embodiment illustrated by the exemplary user interface 300 of FIG. 3, the user can be provided with access to mechanisms by which the user can author content that can be accepted and disseminated via existing social network services. For example, the exemplary user interface 300 of FIG. 3 can enable the user to author a "post" that can be directed to specific individuals available via the user's social network, or which can be made available more generally, such as depending upon the user's privacy settings. As another example, the exemplary user interface 300 of FIG. 3 can enable the user to author a short message that can be broadcast, either to specific individuals, or to anyone accessing such informational content via a social network domain.

The information entry area 330 can, in one embodiment, be prefilled with contextual information indicating, for example, the user's search query. In another embodiment, additional contextual information can also be provided in the information entry area 330. For example, as illustrated by the exemplary user interface 300, the search query identified in the information entry area 330 can be underlined, thereby indicating, in accordance with standard display protocols, that such a search query can be a link to additional information. Such additional information can include additional contextual information such that, as one example, an individual selecting the link can be directed to the search service in such a manner that an analogous search is performed and analogous search results are provided in return. In the specific exemplary context of the ubiquitous World Wide Web, the link that can be prefilled in the information entry area 330 can identify the search query, but can actually comprise a specifically generated Uniform Resource Locator that can specify the appropriate parameters, or that can identify previously saved, or retained, information, such that the individual selecting the link can be presented with search results equivalent to those that the user was presented when the user performed that search.

The information entry area 330 can also enable the user to add additional authored content of their own, or to otherwise modify any content that may have been prefilled into the information entry area 330. In one embodiment, in addition to enabling a user to author content that they can then submit via one or more social networking services, the user can be allowed to select specific ones of the search results to include with such authored content. Thus, in the exemplary user interface 300, shown in FIG. 3, a selection 331 is provided to enable the user to indicate that selected search results should be included with their authored content. In one embodiment, the presentation of the additional user interface elements, such as by user action directed to the user interface element 263, can cause other portions of the exemplary user interface 300 to be modified. In particular, the search results can be modified to include individual selection elements. For example, as illustrated in the exemplary user interface 300, the search results 220 can now comprise a selection element 321. Similarly, each of the other search results, such as the search results 225, 226 and 227 can also comprise selection elements, namely the selection elements 322, 323 and 324, respectively. In a further embodiment, user action directed to the user interface element 263, causing the information entry area 330 to be removed from the exemplary user interface 300, can also cause the selection elements 321, 322, 323 and 324 to be no longer displayed, thereby, in effect, returning the exemplary user interface 300 to a user interface analogous to the exemplary user interface 200 shown in FIG. 2.

User action directed to one or more of the selection elements 321, 322, 323 and 324 can enable a user to select, or unselect, one or more of the search results 220, 225, 226 and 227 on an individual basis. Such selected search results can be included with any content the user authored in the information entry area 330 when the user submits their authored content to one or more social networking services, such as by selecting the post selection 332. For example, a user searching for a particular type of restaurant, such as a sushi restaurant, can be presented with search results identifying one or more sushi restaurants. A specific one of such sushi restaurants can be of interest to the user and, consequently, the user can author content, such as via the information entry area 330, and can select, such as via the mechanisms described above, that one search result identifying the specific sushi restaurant that is of interest to the user. The selected, specific search result can then be included with the content authored by the user in the posting or message that is directed to one or more social networking services.

In one embodiment, in generating a posting, message or other such authored content, such as in the manner described above with reference to exemplary user interface 300 of FIG. 3, the user can be provided, within the exemplary user interface 300, with mechanisms by which the user can select specific individuals to whom such authored content is to be directed. For example, when in a mode within which the user can author content and share search results, the exemplary user interface 300 of FIG. 3 can modify the people search results that were presented, such as in the manner of the exemplary user interface 200 of FIG. 2, which was described in detail above. Such a modification can enable the user to select from among any of the individuals with whom the user shares a connection through one or more social networking services, instead of being limited only to individuals that were deemed responsive to the user's search query. The exemplary user interface 300 of FIG. 3 illustrates one exemplary method for doing so. As shown, those individuals deemed responsive to the user's search query can be retitled as "Friends Who Know" 340, or similar title indicating that such individuals have been deemed to be responsive to the user's search query. Other individuals, with whom the user may have a connection through one or more social networking services, but which have not otherwise been deemed to be relevant to, or responsive to, the user search query, can be presented as the friends 360. Each individual identified, whether they are one of the friends who know 340 or friends 360, can be identified with messaging user interface elements, such as the messaging user interface elements 243, 247, 361 and 362. In one embodiment, selection of such messaging user interface elements can add the corresponding individual to the list of individuals to whom the user authored content, and the individually selected search results, will be specifically directed. As will be recognized by those skilled in the art, while the exemplary user interface 300 of FIG. 3 illustrates only a couple of individuals identified in both the friends who know 340 and the friends 360, additional individuals can be identified and, to the extent that their presentation cannot be made within the display area of the exemplary user interface 300, each of the listings of friends who know 340 and the friends 360 can be independently scrollable or can independently, or together, implement user interface mechanisms to enable the user to be presented with identifications of additional individuals.

Figure 4:
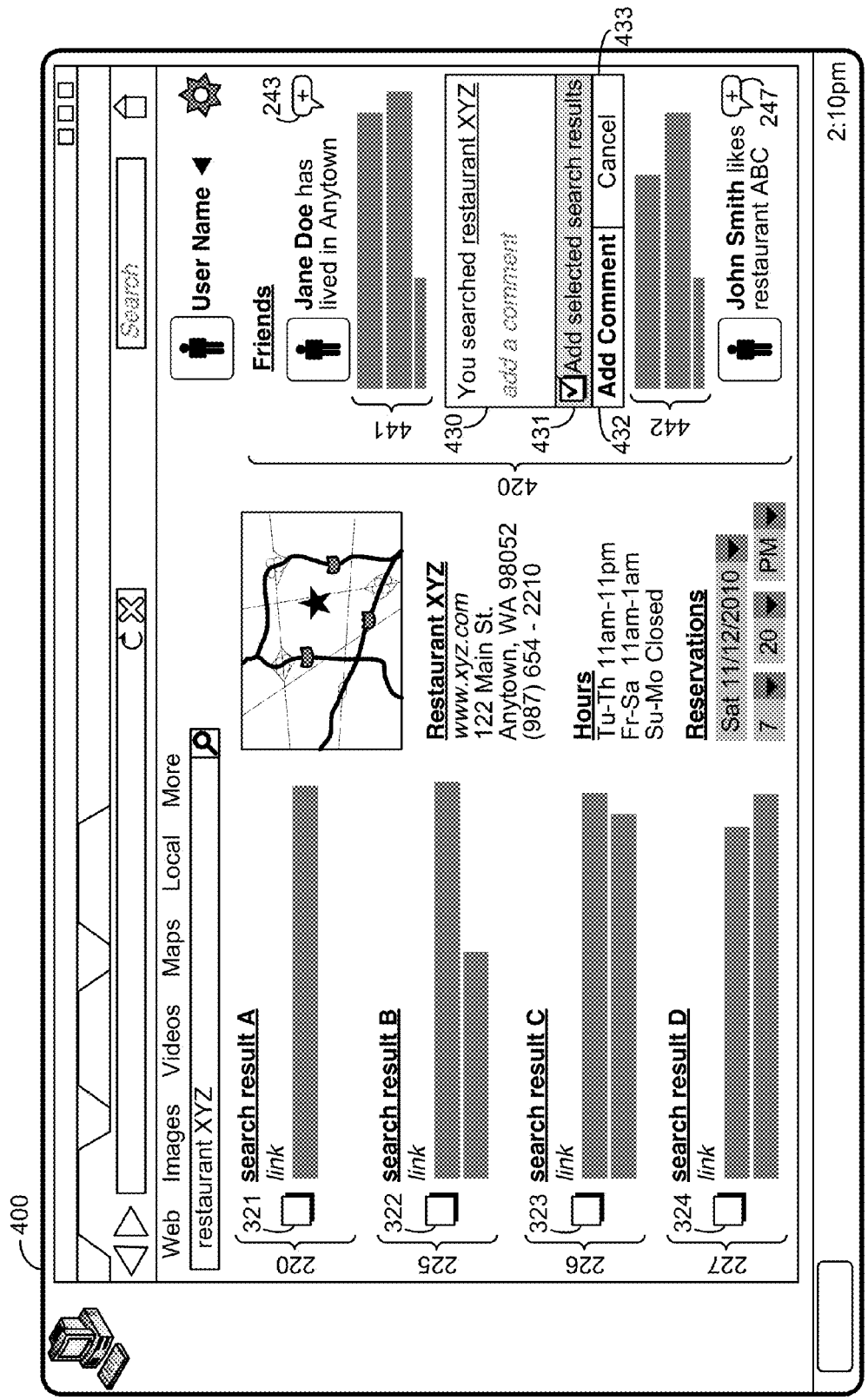
FIG. 4 is a block diagram of another exemplary user interface for sharing search results with individuals from a user's social network.

Turning to FIG. 4, the exemplary user interface 400 shown therein illustrates an alternative embodiment in which a user can author content, and include selected ones of the search results, within an already existing social network context. For example, if a user were to direct a user action to the messaging contact 243, the user can be presented with the exemplary user interface 400 wherein an existing social network context, such as existing messages exchanged through a social network service with the individual "Jane Doe", to whose messaging contact 243 the user action was directed, can be presented as part of the exemplary user interface 400. Such existing messages, or postings, can include the content 441 and the content 442 which can be presented in a manner analogous to that in which it would be presented in the social networking service. For example, as will be recognized by those skilled in the art, social networking services often present authored content in a vertically oriented format such that content authored more recently is visually presented above older content that was authored previously. Additionally, social networking services often present authored content, which is a response to other content, below and indented from such other content to which it is a response. Thus, in one embodiment, the exemplary user interface 400 can maintain such a visual presentation of content when presenting an existing social network context. For example, an existing social network context of the individual "Jane Doe" can include content 441 and content 442, which can be prior messages of the individual "Jane Doe", posts directed to such an individual, possibly in response to an initial posting by such an individual, or other like content. In the exemplary user interface 400 that is shown in FIG. 4, the information entry area 430 can be positioned below the content 441 if it is intended as a response to the content 441 or it would otherwise be visually presented in such a manner when accessed through the social networking service.

The information entry area 430 can operate in a manner analogous to that of the information entry area 330, which was described in detail above. In particular, the user can provide their own content in the information entry area 430, and additional prefilled content can also be provided which can, in one embodiment, include identification of the search performed by the user. Additionally, in one embodiment, the additional prefilled content can include a link, or other like mechanism, by which the context of the search, such as the quantity of search results provided, a particular page of search results that the user may have been viewing, and other like context, can be indicated, thereby enabling a subsequent individual accessing such a posting, or to whom such a posting is directed, to obtain an equivalent search to that of the user and to view equivalent search results to those provided to the user. Additionally, a selection 431 can be provided, which can operate in a manner analogous to that of the selection 331, described in detail above. In particular, via the selection 431, the exemplary user interface 400 can be modified to include the selection elements 321, 322, 323 and 324, which can enable a user to select, or unselect, one or more of the search results 220, 225, 226 and 227, respectively, on an individual basis. As described previously, selection of one or more of the individual search results 220, 225, 226 and 227 can result in those search results being added to the content authored in the information entry area 430. The user can also be provided with an add a comment selection 432 that can cause the content authored by the user, as well as the search results and any appropriate search context, to be submitted to one or more social networking services in the manner specified by the user. Similarly, the user can be provided with a cancel selection 433 that can operate to cancel the user's posting in a manner well known to those skilled in the art.

Figure 5:
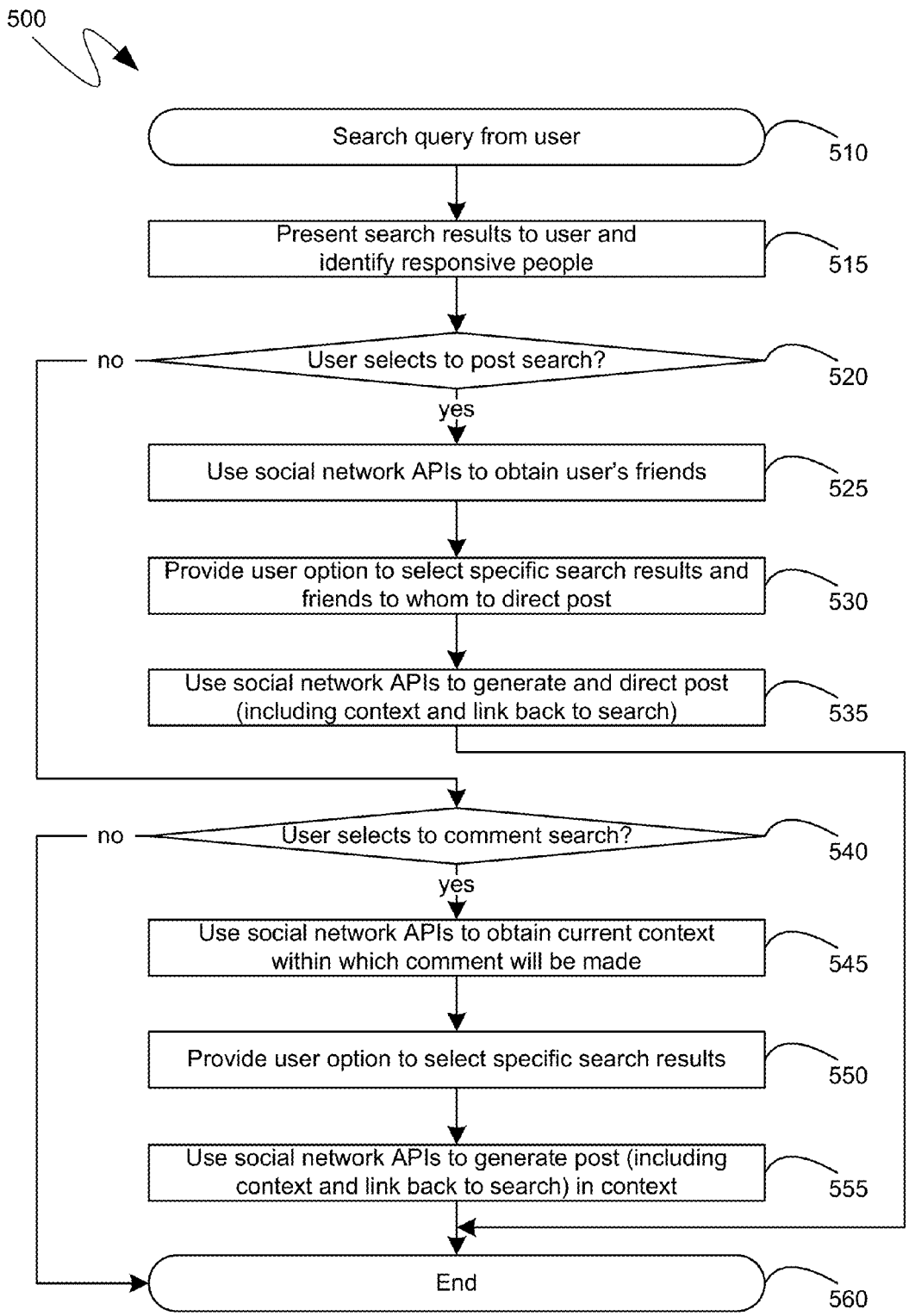
FIG. 5 is a flow diagram of an exemplary operation of computer-executable instructions for sharing search results with individuals from a user's social network.

Turning to FIG. 5, the flow diagram 500 shown therein illustrates an exemplary series of steps that can be performed to facilitate the provision of search results and a search context to one or more individuals via one or more social networking services. Initially, as illustrated in FIG. 5, a search query can be received from the user at step 510. Subsequently, at step 515, search results can be identified and presented to the user. Such search results can include traditional document search results, such as search results identifying one or more webpages. As indicated previously, however, such search results can also include people search results that can identify individuals deemed to be responsive to the search query that was received at step 510.

At step 520, a determination can be made as to whether the user has selected to post the search results, independently of any prior messages or social networking context. If, at step 520, it is determined that the user has selected to post the search results, application program interfaces provided by one or more social networking services can be utilized, at step 525, to obtain information regarding which individuals are connected to the user through the social networking service. In one embodiment, step 525 can be performed as part of the populating of the people database 180, described above, and, as such, need not be performed in response to step 520, but rather can be performed in advance. At step 530, the user can be provided with an interface through which the user can select one or more specific search results to share with other individuals, and can also select one or more specific individuals to whom to direct the user's post. Upon receiving such information from the user, such as via a user interface analogous to that of the exemplary user interface 300 shown in FIG. 3, processing can proceed to step 535 and the application program interfaces of one or more social networking services can be utilized to generate the user's post and direct it to the individuals specified by the user, or, if no such individuals are specifically indicated, to direct the post to the user's social network context where it can be viewed by other individuals. As indicated previously, the content that is posted, via the social network APIs, at step 535, can include a search context, such as a link back to the search, thereby enabling other individuals to perform an analogous search to that performed by the user, and receive analogous search results. The relevant processing can then end at step 560.

If, instead of seeking to post research results at step 520, the user instead selects to comment them into an already existing social network context, such as an already existing conversation or thread in which the user seeks to participate, the user can so select and such a selection can be determined at step 540. Subsequently, at step 545, the APIs provided by one or more social networking services can be utilized to obtain the current social networking context within which the user's comments will be made. Such a current social networking context can include messages or postings made by other individuals, and can be organized and presented in a manner analogous to that in which it would be organized and presented by the social networking service itself, such as, for example, as illustrated by the exemplary user interface 400 shown in FIG. 4. Subsequently, at step 550, the user can be provided with the opportunity to specify specific ones of the search results to be included with the user's comment, such as in the manner illustrated with exemplary user interface 400. At step 555, once the user indicates that such a comment is to be made within a social networking context, application program interfaces of the relevant social networking services can be accessed to generate such a comment within the social networking context within which it was intended. As before, the content that is presented and commented, at step 555, via the social network APIs, can include a search context, such as a link back to the search, thereby enabling other individuals to perform an analogous search to that performed by the user, and receive analogous search results. The relevant processing can then end at step 560.

Figure 6:
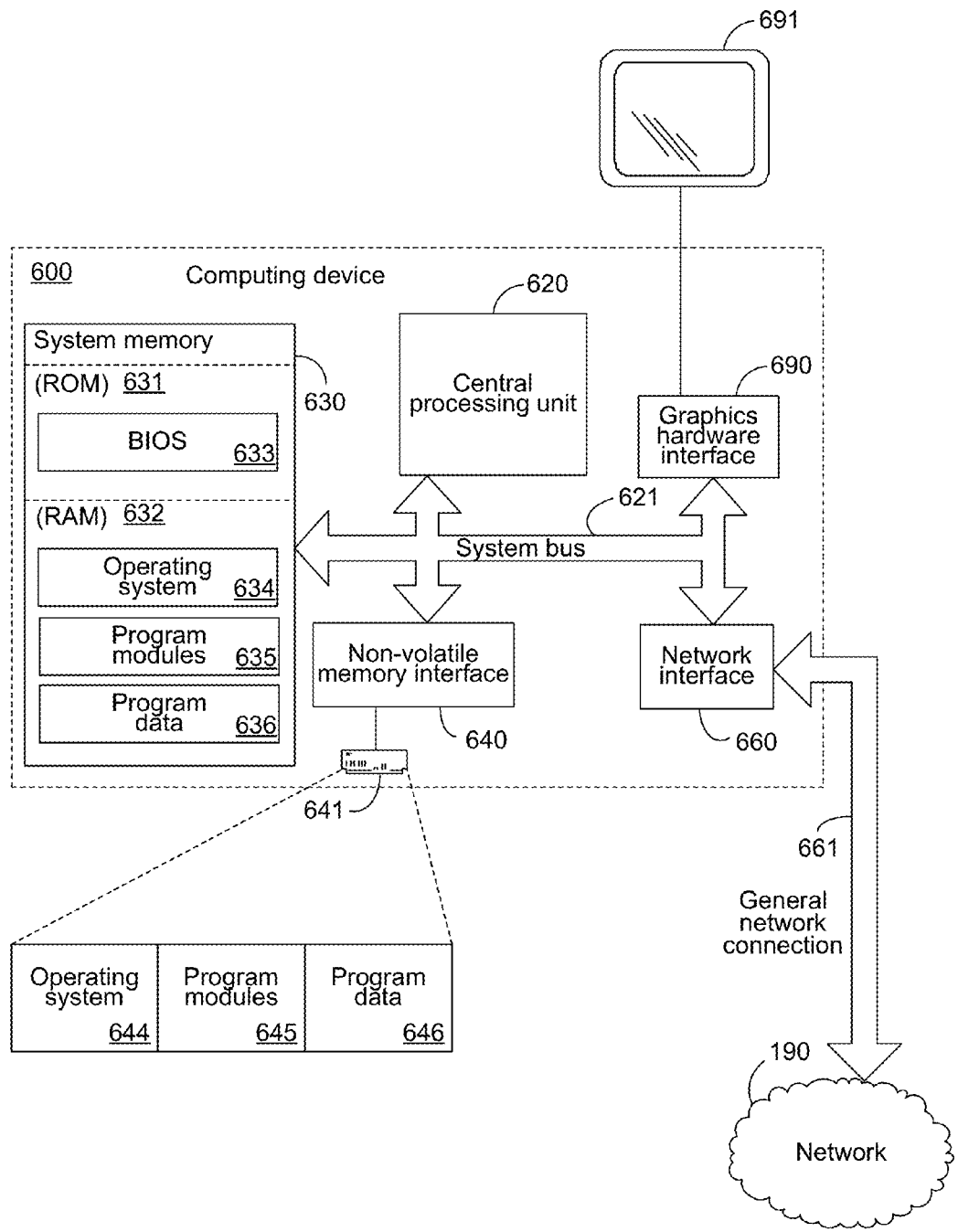
FIG. 6 is a block diagram of an exemplary computing device.

Turning to FIG. 6, an exemplary computing device 600 is illustrated. The exemplary computing device 600 can be any one or more of the computing devices illustrated in FIG. 1, whose operations were described in detail above. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of visual user interfaces, including, but not limited to, a graphics hardware interface 690 and a display device 691, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620.

By way of example, and not limitation, FIG. 6 illustrates the operating system 634 along with other program modules 635, and program data 636.

The computing device 600 may also include other removable/non-removable, volatile/nonvolatile computer storage media. By way of example only, FIG. 6 illustrates the hard disk drive 641 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

As can be seen from the above descriptions, mechanisms and user interfaces have been presented for facilitating the sharing of search results in social networking contexts. In view of the many possible variations of the subject matter described herein, we claim as our invention all such embodiments as may come within the scope of the following claims and equivalents thereto.

We claim:

1. A method for enabling social network interaction via a graphical user interface comprising search results, the graphical user interface being physically generated on a hardware display device by a computing device, the method comprising the steps of:
generating, in the graphical user interface, a presentation of multiple document search results identifying a first set of documents responsive to a user's search;
generating, in the graphical user interface, a presentation of an identification of a first individual responsive to the user's search, the first individual being associated with the user via an external social networking service;
receiving, via the graphical user interface, user-authored content to be directed to the social networking service;
including, as part of the user-authored content, a search context utilizable by recipients of the search context to subsequently perform, after receiving the search context, an equivalent search to the user's search and receive identical document search results to the multiple document search results presented to the user;
including, as part of the user-authored content, a further search context comprising at least one of the multiple document search results;
submitting the user-authored content to the social networking service to be included in a social networking context of the user; and
generating, for at least some of the multiple document search results, individual selection elements by which the user can specify the inclusion of individual ones of the multiple document search results in the user-authored content.

2. The method of claim 1, wherein the further search context comprises specified individual ones of the multiple document search results that were specified for inclusion in the user-authored content.

3. The method of claim 1, further comprising the steps of: removing the generated individual selection elements if a user action causes a user-authored content entry area to no longer be displayed.

4. The method of claim 1, further comprising the steps of: generating, in the graphical user interface, in response to a user action initiating the authoring of content to be directed to the social networking service, a presentation of an identification of a second individual also associated with the user via the social networking service, the second individual not being responsive to the user's search; wherein both the presentation of the identification of the first individual and the presentation of the second individual each, individually comprise messaging user interface elements to allow the user to specify to which of the first individual or the second individual to direct the user-authored content.

5. The method of claim 1, wherein the submitting the user-authored content to the social networking service to be included in the social networking context of the user comprises submitting the user-authored content to the social networking service such that the user-authored content is directed to the first individual in response to pre-existing content authored by the first individual.

6. The method of claim 5, further comprising the steps of:
obtaining, from the social networking service, a social context comprising the pre-existing content authored by the first individual; and
generating, in the graphical user interface, the user-authored content within the social context;
wherein, the obtaining the social context and the generating the user-authored content within the social context are performed in response to user action directed to a messaging user interface element presented with the identification of the first individual.

7. The method of claim 1, wherein the search context comprises a link back to a search service generating the multiple document search results, the link comprising parameters referencing the user's search.

8. A graphical user interface, generated on a display device by a computing device, enabling social network interaction while presenting search results, the user interface comprising:
a presentation of multiple document search results identifying a first set of documents responsive to a user's search;
a presentation of an identification of a first individual responsive to the user's search, the first individual being associated with the user via an external social networking service;

user-authored content generated by the user utilizing the user interface, the user-authored content to be directed to the social networking service;

a search context, automatically generated in the user-authored content, the search context being utilizable by recipients of the search context to subsequently perform, after receiving the search context, an equivalent search to the user's search and receive identical document search results to the multiple document search results presented to the user, a further search context, also generated in the user-authored content, the further search context comprising at least one of the multiple document search results; and individual selection elements for at least some of the multiple document search results by which the user can specify the inclusion of individual ones of the multiple document search results in the user-authored content.

9. The graphical user interface of claim 8, further comprising a user interface element for triggering display of the individual selection elements.

10. The graphical user interface of claim 8, further comprising a presentation of an identification of a second individual also associated with the user via the social networking service, the second individual not being responsive to the user's search; wherein both the presentation of the identification of the first individual and the presentation of the second individual each, individually comprise messaging user interface elements to allow the user to specify to which of the first individual or the second individual to direct the user-authored content.

11. The graphical user interface of claim 8, further comprising a social context comprising pre-existing content authored by the first individual; wherein the user-authored content is visually presented in the social context; and wherein further the user-authored content is in response to the pre-existing content.

12. One or more computer-readable storage media comprising computer-executable instructions for enabling social network interaction, the computer-executable instructions directed to steps comprising:

generating document search results identifying a first set of documents responsive to a user's search;

generating an identification of a first individual responsive to the user's search, the first individual being associated with the user via an external social networking service;

receiving user input comprising user-authored content to be directed to the social networking service;

generating a search context utilizable by recipients of the search context to subsequently perform, after receiving the search context, an equivalent search to the user's search and receive identical document search results to the generated document search results;

including the generated search context as part of the user-authored content;

generating a further search context comprising at least one of the multiple document search results;

including the generated further search context as part of the user-authored content;

receiving user input specifying, individually, one or more of the document search results to be included in the user-authored content; and submitting the user-authored content to the social networking service to be included in a social networking context of the user.

13. The computer-readable storage media of claim 12, wherein the further search context comprises the individual ones of the multiple document search results that were specified by the user.

14. The computer-readable storage media of claim 12, comprising further computer-executable instructions for: obtaining, from the social networking service, a second individual associated with the user, the second individual differing from the first individual; and generating an identification of the second individual irrespective of the second individual's responsiveness to the user's search, thereby enabling the user to direct the user-authored content to the second individual via the social networking service.

15. The computer-readable storage media of claim 12, wherein the computer-executable instructions for submitting the user-authored content to the social networking service to be included in a social networking context of the user comprise computer-executable instructions for utilizing interfaces of the social networking service to direct user-authored content to the first individual as a response to pre-existing content authored by the first individual through the social networking service.

16. The computer-readable storage media of claim 15, comprising further computer-executable instructions for:

obtaining, from the social networking service, a social context comprising the pre-existing content authored by the first individual; and generating the user-authored content within the social context;

wherein, the computer-executable instructions for obtaining the social context and the computer-executable instructions for generating the user-authored content within the social context are executed in response to user action directing the user-authored content to the first individual.

17. The computer-readable storage media of claim 12, wherein the computer-executable instructions for generating the search context comprise computer-executable instructions for generating a link back to a search service generating the multiple document search results, the link comprising parameters referencing the user's search.

\* \* \* \* \*